(12) United States Patent
Pickard et al.

(10) Patent No.: US 11,365,678 B2
(45) Date of Patent: Jun. 21, 2022

(54) SELF MODULATING VALVE

(71) Applicant: Rolls-Royce Corporation, Indianapolis, IN (US)

(72) Inventors: Andrew C. Pickard, Indianapolis, IN (US); Danielle J. Wilson, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 613 days.

(21) Appl. No.: 16/224,168

(22) Filed: Dec. 18, 2018

(65) Prior Publication Data

US 2020/0131991 A1 Apr. 30, 2020

Related U.S. Application Data

(60) Provisional application No. 62/752,040, filed on Oct. 29, 2018.

(51) Int. Cl.
| | |
|---|---|
| *F02C 7/047* | (2006.01) |
| *F02C 7/232* | (2006.01) |
| *G05D 23/12* | (2006.01) |
| *G05D 23/02* | (2006.01) |
| *F16K 31/00* | (2006.01) |
| *F16K 3/26* | (2006.01) |
| *B64D 15/04* | (2006.01) |
| *F01D 17/16* | (2006.01) |
| *B64D 15/22* | (2006.01) |
| *F02C 9/26* | (2006.01) |

(Continued)

(52) U.S. Cl.
CPC .............. *F02C 7/047* (2013.01); *F02C 7/232* (2013.01); *F16K 3/265* (2013.01); *F16K 31/002* (2013.01); *G05D 23/025* (2013.01); *G05D 23/123* (2013.01); *B64D 15/04* (2013.01); *B64D 15/22* (2013.01); *F01D 17/145* (2013.01); *F01D 17/162* (2013.01); *F01D 25/02* (2013.01); *F02C 9/263* (2013.01)

(58) Field of Classification Search
CPC .......... F02C 7/047; F02C 7/232; F02C 9/263; F16K 3/265; F16K 31/002; G05D 23/025; G05D 23/123; B64D 15/04; B64D 15/22; F01D 17/145; F01D 17/1652; F01D 25/02
USPC ...................................... 236/101 R, 102, 103
See application file for complete search history.

(56) References Cited

U.S. PATENT DOCUMENTS

| | | |
|---|---|---|
| 3,246,840 A | 4/1966 | Matthies |
| 3,278,241 A | 10/1966 | Stelzer |

(Continued)

*Primary Examiner* — Marc E Norman
(74) *Attorney, Agent, or Firm* — Crowell & Moring LLP (57) ABSTRACT

A fluid valve is provided including an inner shell and an outer shell. The inner shell includes a sidewall having a first opening and an interior surface defining an inner chamber. The outer shell includes a sidewall having a second opening and an exterior surface defining an outer chamber. The inner shell is positioned within the outer shell and the inner shell is movable relative to the outer chamber between a first position and a second position by a change in fluid conditions of a fluid supplied to the fluid valve. The first opening and the second opening overlap to define a passageway extending from the interior surface of the inner shell to the exterior surface of the outer shell. Relative movement of the inner shell from the first position toward the second position reduces a cross-sectional area of the passageway.

16 Claims, 7 Drawing Sheets

(51) Int. Cl.
  *F01D 17/14* (2006.01)
  *F01D 25/02* (2006.01)

(56) References Cited

U.S. PATENT DOCUMENTS

| | | | |
|---|---|---|---|
| 3,388,861 A * | 6/1968 | Harding | F16K 11/07 |
| | | | 236/12.2 |
| 3,401,849 A | 9/1968 | Weber, III | |
| 3,612,618 A | 10/1971 | Swanson | |
| 3,664,462 A | 5/1972 | Smith, Sr. | |
| 4,154,260 A | 5/1979 | Shutt | |
| 4,246,325 A | 1/1981 | Hatch | |
| 5,803,354 A * | 9/1998 | Benedict | G05D 23/134 |
| | | | 236/101 D |
| 6,467,264 B1 | 10/2002 | Stephenson et al. | |
| 7,526,911 B2 | 5/2009 | Pickard et al. | |
| 9,726,440 B2 * | 8/2017 | Bhatia | F28F 9/22 |
| 9,732,866 B2 * | 8/2017 | Dolgos | E03C 1/041 |
| 10,478,871 B2 * | 11/2019 | Wiwi | B08B 9/053 |
| 2016/0139616 A1 * | 5/2016 | Mellah | E21B 43/2406 |
| | | | 236/101 R |

* cited by examiner

FIG. 9

SELF MODULATING VALVE

CROSS REFERENCE

The present application is a divisional application of, and claims priority under 35 U.S.C. § 119(e) to U.S. Provisional Application No. 62/752,040, filed Oct. 29, 2018, entitled "Self-Modulating Valve," which is incorporated by reference in its entirety.

TECHNICAL FIELD

This disclosure relates to valves for gas turbine engines, and, in particular to anti-icing valves.

BACKGROUND

Present anti-icing systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Anti-icing systems used with gas turbine engines typically require more fluid from the gas turbine engine when the gas turbine engine is starting up than when the gas turbine engine is at steady-state operational conditions. Furthermore, when the gas turbine engine is at steady-state operational conditions, the flow of hot, high pressure fluid to the anti-icing system may need to be restricted to prevent damaging vulnerable external components. Additionally, because anti-icing systems are used intermittently as required by the weather, debris may accumulate in the valve while not in use, causing early and frequent failures of the valve. Therefore, it is desirable that a valve for an anti-icing system be capable of self-modulating the flow of fluid as the gas turbine engine starts up, and that the anti-icing system is able to clear debris from the valve.

The following description is merely exemplary in nature and is not intended to limit the present disclosure, application, or uses.

By way of an introductory example, a fluid valve is provided including an inner shell and an outer shell. The inner shell includes a sidewall having a first opening and an interior surface defining an inner chamber. The outer shell includes a sidewall having a second opening and an exterior surface defining an outer chamber. The inner shell is positioned within the outer shell and the inner shell is movable relative to the outer chamber between a first position and a second position by a change in fluid conditions of a fluid supplied to the fluid valve. The first opening and the second opening overlap to define a passageway extending from the interior surface of the inner shell to the exterior surface of the outer shell. Relative movement of the inner shell from the first position toward the second position reduces a cross-sectional area of the passageway.

One interesting feature of the systems and methods described below may be that valve may be self-modulating, decreasing the cross-sectional area of the passageway without operator input responsive to a change in the condition of the gas turbine engine supplying the fluid. This may allow the anti-icing system to function while the gas turbine engine is starting up and may increase efficiency of the gas turbine engines by restricting the amount of compressed air which is bled off to the anti-icing system.

Another interesting feature of the systems and methods described below may be that the valve may restrict the flow of fluid when the gas turbine engine is at steady-state operational conditions, preventing damage to vulnerable external components, such as the engine inlet vanes.

Another interesting feature of the systems and methods described below may be that the valve may be sealed while the anti-icing system is not in use, preventing debris from accumulating in the valve. Furthermore, the portions of the anti-icing system upstream from the valve may be vented to clear debris before the anti-icing system is used.

Figure 1:
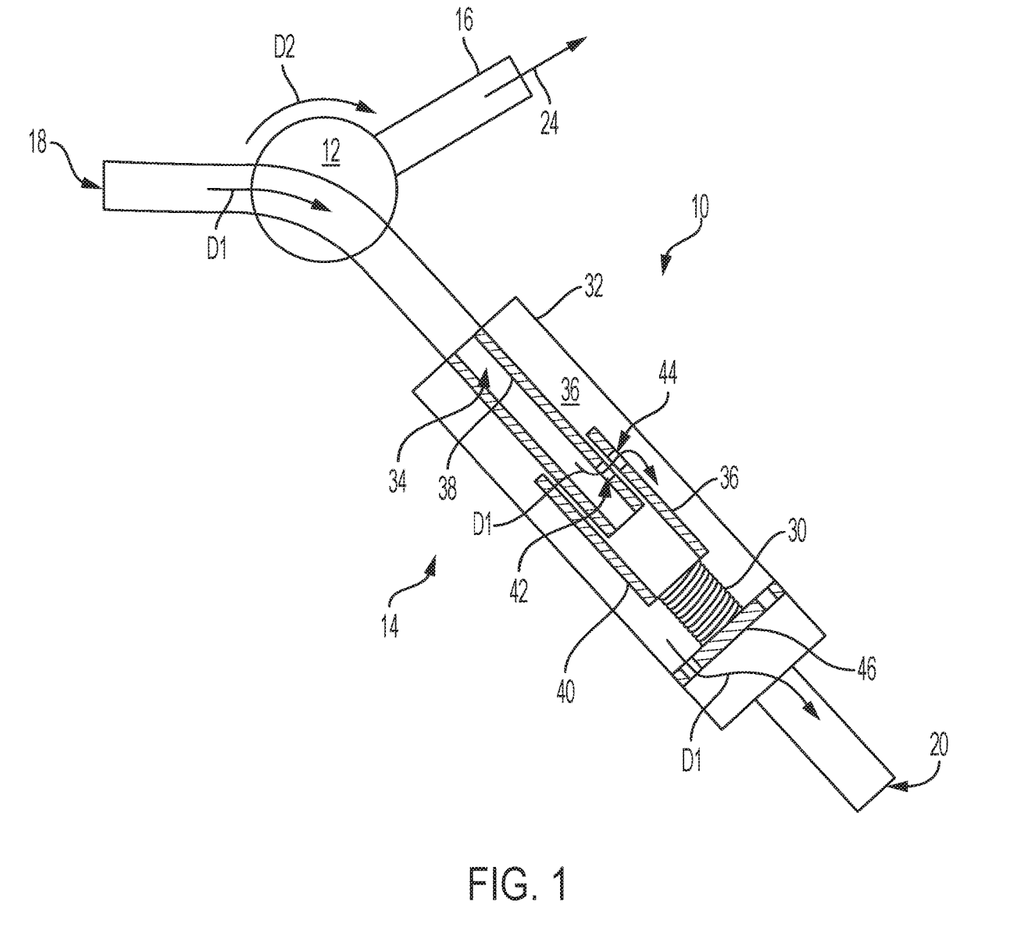
FIG. 1 illustrates a cross-sectional view of an example of an anti-icing system including a first example of a self-modulating valve and an example of a cut-off valve.

FIG. 1 illustrates a cross-sectional view of an anti-icing system 10 for use with a gas turbine engine. The anti-icing system 10 may be any system which delivers fluid from a gas turbine engine to parts of the engine or aircraft to prevent ice formation or remove existing ice. Examples of the anti-icing system 10 may include a high pressure compressor-bled air system, or a low pressure compressor-bled air system. The anti-icing system 10 may receive fluid such as compressed air from a compressor of a gas turbine engine. The fluid may then be distributed to components of the gas turbine engine or the aircraft that are vulnerable to ice formation, such as engine inlet vanes. The fluid received from the compressor may change as the gas turbine engine starts up. Initially, the fluid received from the compressor may be low pressure and cool: as low as 50 degrees Fahrenheit and 50 pounds per square inch (PSI) in some examples. In this situation, the anti-icing system 10 may require more fluid to prevent ice formation than when the gas turbine engine has completely started. As the compressor spins faster, the pressure and temperature of the fluid delivered to the anti-icing system 10 may increase, allowing the anti-icing system 10 to operate effectively with less fluid than earlier when the compressor spun more slowly. When the gas turbine engine is at steady-state operational conditions, the fluid delivered to the anti-icing system may be up to 800 degrees Fahrenheit and 250 PSI in some examples.

The anti-icing system 10 may include an inlet 18, an outlet 20, a shut-off valve 12, and a self-modulating valve 14. The inlet 18 may be any portion of the anti-icing system 10 which receives fluid from the compressor or another fluid source. Examples of the inlet 18 may include an opening, a pipe, or a tube. The outlet 20 may be any portion of the anti-icing system 10 which delivers fluid to target areas of the gas turbine engine or aircraft to prevent ice formation. Examples of the outlet 20 may include an opening, a pipe, or a network of tubes.

The shut-off valve 12 may be any valve which is arranged between the inlet 18 and the outlet 20 and which is capable of selectively preventing or allowing the flow of fluid from the inlet 18 to the outlet 20. Examples of the shut-off valve 12 may include a rotary-solenoid operated valve, a directional globe valve, or a valve which automatically redirects flow responsive to a change in ambient conditions. The shut-off valve 12 may be activated to direct fluid toward the outlet 20 when the anti-icing system 10 is in use. The shut-off valve 12 may also be used to prevent fluid from reaching the outlet 20 when the anti-icing system 10 is not in use. Sealing the outlet 20 at the shut-off valve 12 may prevent debris from accumulating within the anti-icing system 10 when the anti-icing system 10 is not in use.

In some situations, debris may accumulate upstream from the shut-off valve 12 when the anti-icing system is not in use. Accordingly, the shut-off valve 12 may be coupled to a vent 16 which may be used to remove debris. The vent 16 may be any fluid pathway which is in connection with the shut-off valve 12 and which may receive and dispose of fluid and debris from the inlet 18. Examples of the vent 16 may include a pipe, a tube, or an opening.

The shut-off valve 12 may be placed in a first position, shown in FIG. 1, allowing a direction of fluid flow D1 to extend from the inlet 18 to the outlet 20, when the anti-icing system 10 is in use. The shut-off valve 12 may also be placed in a second position, preventing fluid from the inlet 18 from passing the shut-off valve 12. The shut-off valve 12 may be placed in the second position when the anti-icing system 10 is not needed. The shut-off valve 12 may also be placed in a third position, allowing a direction of fluid flow D2 to extend from the inlet 18 to the vent 16. The shut-off valve 12 may be placed in the third position before operating the anti-icing system 10 to remove debris from upstream of the shut-off valve 12, or periodically to remove debris during a prolonged period where the anti-icing system 10 may not be in use. In some embodiments, the shut-off valve 12 may be rotated in a direction D2 between the first position, the second position, and the third position.

The self-modulating valve 14 may be any valve which is capable of automatically restricting the flow of fluid responsive to a change in fluid conditions of the fluid passing through the anti-icing system 10. Examples of the self-modulating valve 14 may include a throttling valve, a relief valve, or a control valve. The self-modulating valve 14 may include an inner shell 26 and an outer shell 28 confined within a casing 32. The inner shell 26 may be any structure which is capable of receiving fluid from the inlet 18 and which may be positioned within the outer shell 28. Examples of the inner shell 26 may include a cylinder, a box, or a case. The inner shell may include an interior surface 38 defining an inner chamber 34.

The outer shell 28 may be any structure which is capable of receiving the inner shell 26. Examples of the outer shell 28 may include a cylinder, a box, or a case. The casing 32 may be any structure which encloses the outer shell 28 and at least a portion of the inner shell 26. Examples of the casing 32 may include a shell, a cylinder, or a box. An outer chamber 36 may be defined between an exterior surface 40 of the outer shell 28 and the casing 32. In some embodiments the positions of the outer shell 28 and the inner shell 26 could be switched from the embodiment shown in FIG. 1, such that the direction of fluid flow D1 extends from the inlet 18 through the outer shell 28 and then into the inner chamber 34 defined by the inner shell 26.

The inner shell 26 may also include an inner sidewall 22 having a first opening 42 extending therethrough. The outer shell 28 may include an outer sidewall 24 having a second opening 33 extending therethrough. The inner shell 26 and the outer shell 28 may be positioned such that the first opening 42 and the second opening 44 are aligned and overlapping, forming a passageway (48 in FIG. 2) extending from the interior surface 38 of the inner shell 26 to the exterior surface 40 of the outer shell 28. When the first opening 42 and the second opening 44 are aligned and overlapping, the direction of flow D1 of fluid may extend from the inner chamber 34 to the outer chamber 36. From the outer chamber 36, the direction of flow D1 of fluid may extend to the outlet 20 of the anti-icing system 10.

The self-modulating valve 14 may also include a spring 30 positioned between outside of the inner shell 26 and the outer shell 28. The spring 30 may be any biasing mechanism which is capable of applying a force to move the inner shell 26 relative to the outer shell 28. Examples of the spring 30 may include a compression spring, an extension spring, a linear spring, or a variable rate spring. As shown in FIG. 1, an end of the spring 30 may be coupled to the outer shell 28, however, in other embodiments, the spring may be coupled to the inner shell 26. The other end of the spring 30 may be coupled to the casing 32 or to a brace 46 positioned within the casing 32. The brace 46 may be any object which can be coupled to the spring 30 and maintain a fixed position relative to the spring 30. Examples of the spring 30 may include a grate, a plank, or a disc. Depending on the arrangement of the outer chamber 36, the brace 46 may need to be porous to allow fluid flow to the outlet 20, as shown in FIG. 1.

Figure 2:
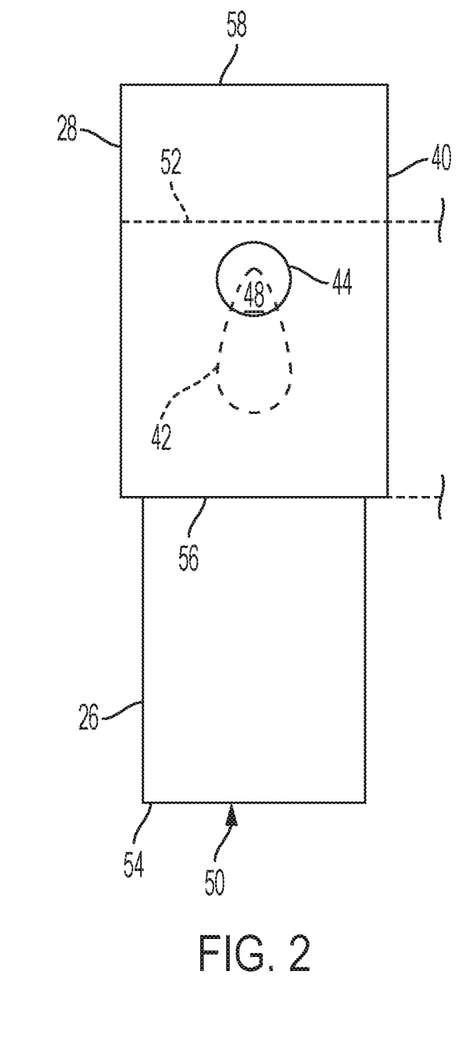
FIG. 2 illustrates a front plan view of a second example of an inner shell and an outer shell of a self-modulating valve.
Figure 3:
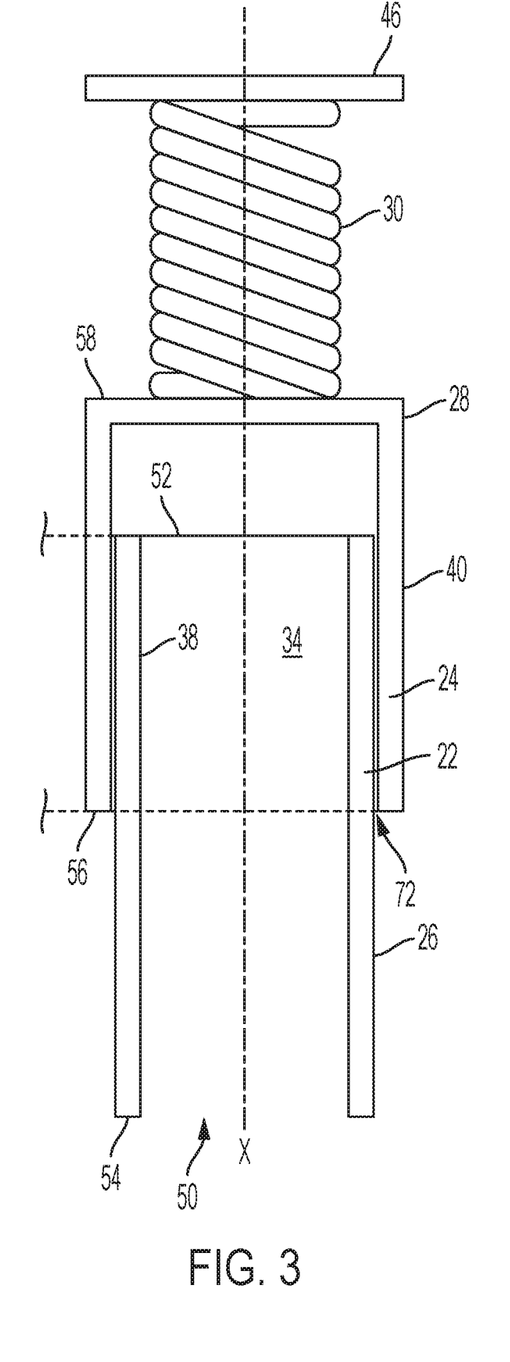
FIG. 3 illustrates a front cross-sectional view of the inner shell and outer shell shown in FIG. 2.

FIGS. 2 and 3 illustrate a plan view and a cross-sectional view of an embodiment of the inner shell 26 and outer shell 28 within the self-modulating valve 14. As shown in FIGS. 2 and 3, the inner shell 26 may have a first end 52 which is positioned inside the outer shell 28. The inner shell 26 may also have a second end 54 which is positioned outside the outer shell 28. The inner shell 26 may have an opening 50 at or near the second end 54 to allow fluid to enter the inner chamber 34 from the opening. The outer shell 28 may have a first end 56 which encircles a portion of the inner shell 26, causing the sidewall 22 of the inner shell 26 and the sidewall 24 of the outer shell 28 to overlap. The outer shell 28 may also have a second end 58 which is coupled to the spring 30. The inner shell 26 and the outer shell 28 may be movable relative to one another along an axis X. The second end 58 of the outer shell 28 may also define a limit to the movement of the inner shell 26 within the outer shell 28.

A gap 72 may exist between the sidewall 22 of the inner shell 26 and the sidewall 24 of the outer shell 28. If the gap 72 is large, fluid may pass through the gap 72, hindering the self-modulating valve's 14 ability to regulate fluid flow through the anti-icing system. Furthermore, a large gap 72 may cause debris to accumulate between the inner shell 26 and the outer shell 28, potentially obstructing relative movement between the inner shell 26 and the outer shell 28. Therefore, the gap 72 may be as small as possible to still allow smooth movement between the inner shell 26 and the outer shell 28, and to allow passage of a volume of leakage fluid that is smaller than the minimum flow required through the valve 14.

The spring 30 coupled to the second end 58 of the outer shell 28 may be a compression spring, storing energy as it is compressed by the outer shell 28. The spring 30 may be positioned along the axis X. Under low pressure conditions, the spring 30 may maintain the outer shell 28 at a first position such that the first opening 42 and the second opening 44 overlap to form the passageway 48. As the pressure within the inner chamber 34 increases, the outer shell 28 may partially retract from the inner shell 26 toward the spring 30. The spring 30 may be calibrated to resist the movement of the outer shell 28 and exert an expanding force on the outer shell 28 such that, at an optimum pressure, the outer shell 28 is maintained in a second position such that the first opening 42 and the second 44 opening to overlap to reduce the cross-sectional area of the passageway 48 than the passageway 48 formed in the first position.

The first opening 42 and the second opening 44 may overlap to form the passageway 48 allowing fluid to pass from the inner chamber 34 to the outer chamber 36. As shown in FIG. 2, the first opening and the second opening may be differently shaped to change the cross-sectional area of the passageway 48 as the inner shell 26 and the outer shell 28 move relative to one another. For example, the first opening 42 may have a width which varies along the axis X to form a tear-drop shape. Comparably, the second opening 44 may be circular in shape. The first opening 42 may be longer than second opening 44 along the axis X, extending from a bottom with a maximum width which is similar to or greater than the maximum width of the second opening 44 to a top with a maximum width which is less than the maximum width of the second opening 33. In the first position, the circular second opening 44 may overlap entirely with the bottom of the tear-drop shaped first opening 42. However, as shown in FIG. 2, as the inner shell 26 and the outer shell 28 move to the second position, the circular second opening 44 may only partially overlap with the smaller width top of the tear-drop shaped first opening 42. The cross-sectional area of the passageway 48 may be defined by the amount that the first opening 42 and the second opening 44 overlap. Therefore, in the second position, the cross-sectional area of the passageway 48 is less than the cross-sectional area of the passageway 48 in the first position.

Figure 4:
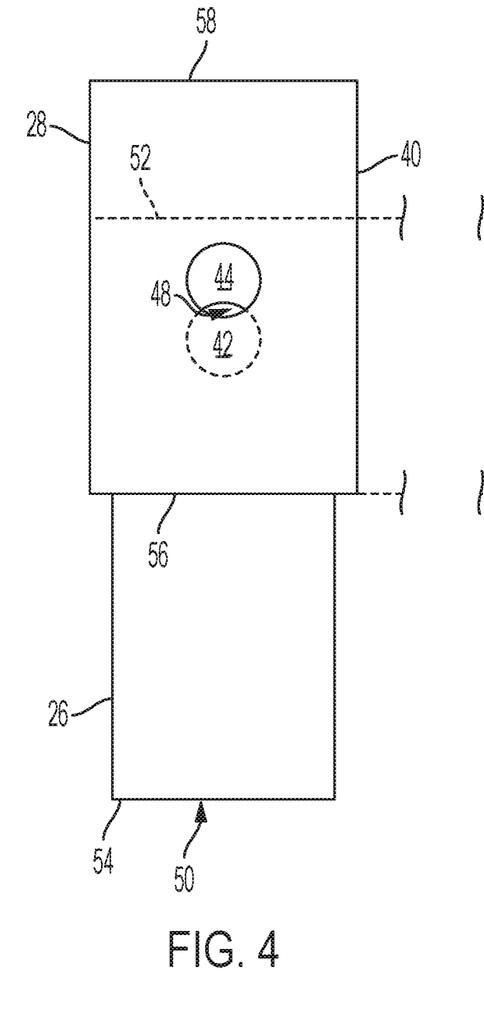
FIG. 4 illustrates a front plan view of a third example of an inner shell and an outer shell of a self-modulating valve.
Figure 5:
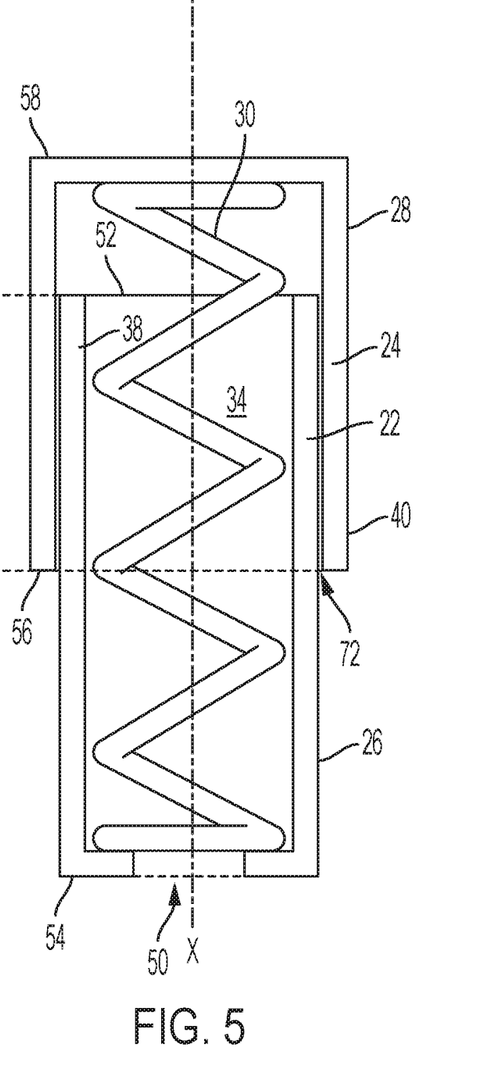
FIG. 5 illustrates a front cross-sectional view of the inner shell and outer shell shown in FIG. 4.

FIGS. 4 and 5 illustrate a plan view and a cross-sectional view of an alternative embodiment of the inner shell 26 and outer shell 28 within the self-modulating valve 14. As shown in FIG. 5, the spring 30 may be positioned within the inner chamber 34. The spring 30 coupled to the second end 58 of the outer shell 28 and the second end 54 of the inner shell 26 may be an extension spring, storing energy as it is pulled apart by the outer shell 28. The spring 30 may be positioned along the axis X. Under low pressure conditions, the spring 30 may maintain the outer shell 28 at a first position such that the first opening 42 and the second opening 44 overlap to form the passageway 48. As the pressure within the inner chamber 34 increases, the outer shell 28 may partially move away from the inner shell 26, pulling the spring 30. The spring 30 may be calibrated to resist the movement of the outer shell 28 and exert a retracting force on the outer shell 28 such that, at an optimum pressure, the outer shell 28 is maintained in a second position such that the first opening 42 and the second 44 opening to overlap to reduce the cross-sectional area of the passageway 48 than the passageway 48 formed in the first position.

FIG. 5 also illustrates that the first opening 42 and the second opening 44 may have identical circular shapes. In the first position, these circular shapes may entirely overlap to form the passageway 48, however, in the second position, the passageway 48 may only be defined by overlapping portions of the circular-shaped first and second openings 42, 44.

Figure 6:
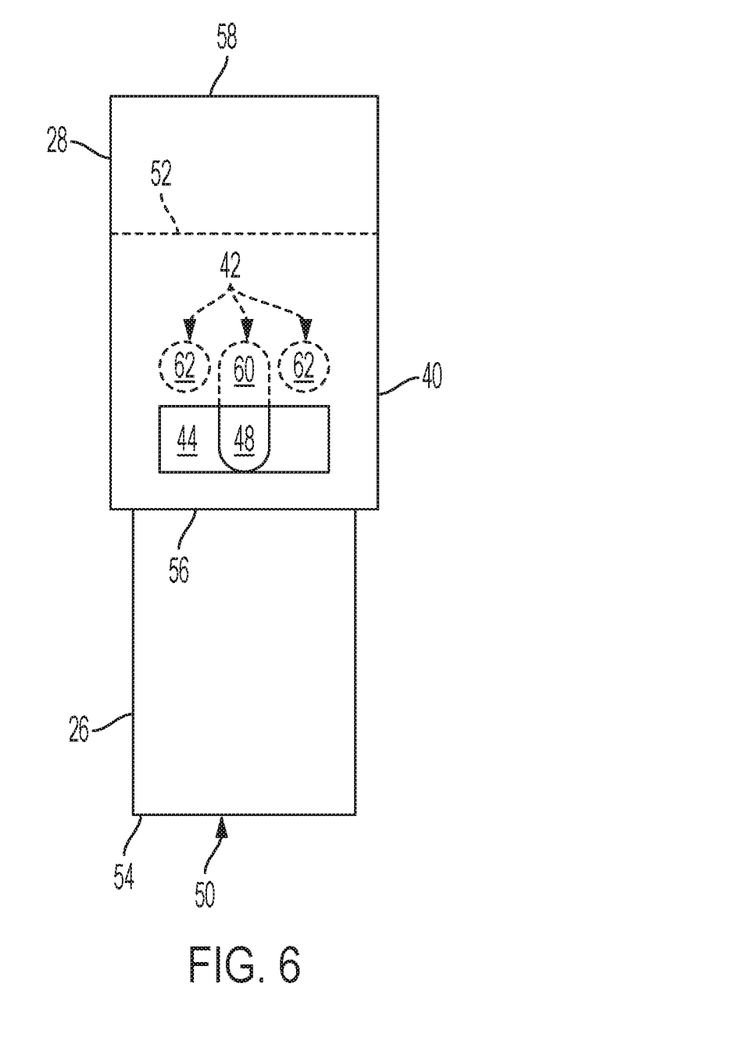
FIG. 6 illustrates a front plan view of a fourth example of an inner shell and an outer shell of a self-modulating valve.

FIG. 6 illustrates a plan view of another example of the inner shell 26 and the outer shell 28. As illustrated, the outer shell 28 may have a single large second opening 44. Comparatively, the inner shell 26 may have a plurality of first openings 42 spaced circumferentially apart from one another about the inner shell 26. In the first position, the second opening 44 may overlap with all of the first openings 42, or at least more than half of the total cross-sectional are of the first openings 42. However, in the second positon, at least a portion of the first openings are covered or occluded by the outer shell 28 as illustrated in FIG. 6. To accommodate this, some of the first openings 42 may have different shapes. For example, some of the first openings 42 may be circular openings 62 which have a limited length along the axis X and are only exposed in the first position. Additional some of the first openings 42 may be slot openings 60 which extend longer along the axis X than the circular openings 62 and are at least partially exposed in the both the first position and the second position. The first openings 29 may be otherwise shaped, such as rectangular openings, or openings which increase in width along the axis X defined by an equation.

Figure 7:
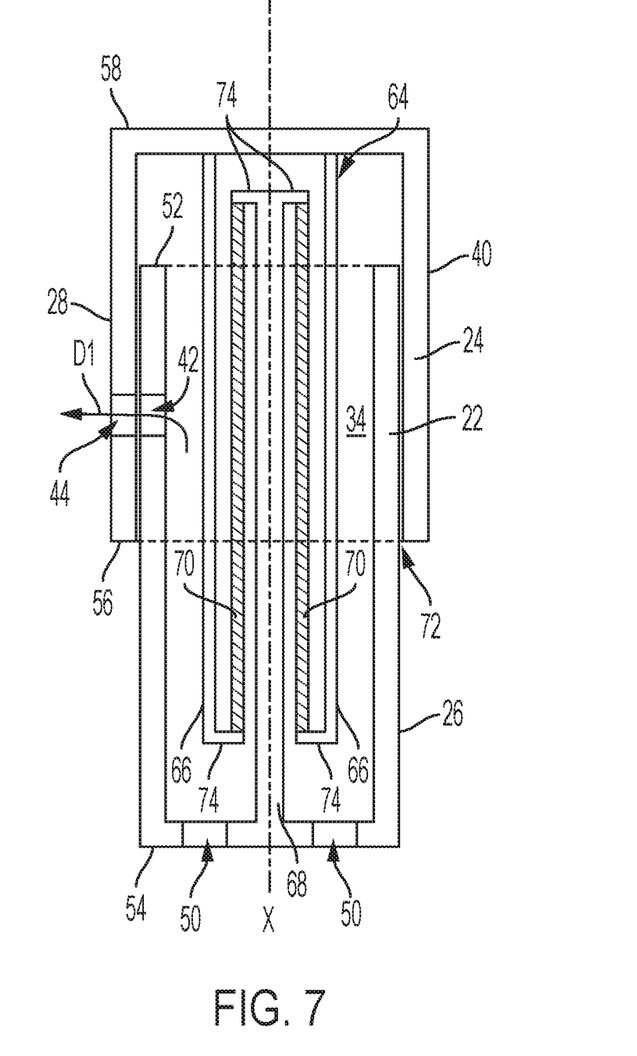
FIG. 7 illustrates a cross-sectional view of a fifth example of an inner shell and an outer shell of a self-modulating valve.

FIG. 7 illustrates a cross-sectional view of another example of the inner shell 26 and the outer shell 28. In some embodiments, the relative movement of the inner shell 26 and the outer shell 28 may be response to a change in the temperature of the fluid passing through the self-modulating valve 14. A metallic expansion mechanism 64 may be arranged within the inner chamber 34 to move the inner shell 26 and the outer shell 28 between the first position and the second position. The metallic expansion mechanism 64 may be device which is coupled to the inner shell 26 and the outer shell 28 and is capable of moving the relative positions of the inner shell 26 and the outer shell 28 responsive to a change in the temperature of the fluid passing through the self-modulating valve 14. Examples of the metallic expansion mechanism 64 may include a single element expansion mechanism or a multi-element expansion mechanism.

For example, in some embodiments the inner shell 26 and the outer shell 28 may be made of a first material, such as Invar, Chromium, Tungsten, or a ceramic material, having a relatively low coefficient of thermal expansion. The metallic expansion mechanism 64 may comprise a single expansive element 70 extending between the second end 54 of the inner shell 26 and the second end 58 of the outer shell 28. The expansive element 70 may be made of a second material, such as steel, aluminum, or bronze, having a coefficient of thermal expansion which is higher than the first material. In some embodiments, the expansive element 70 may be made of a memory metal such as Nitinol. The expansive element 70 may be any element within the inner chamber 34 capable of moving the inner shell 26 and the outer shell 28 responsive to a change in the temperature of the fluid passing through the self-modulating valve 14. Examples of the expansive element 70 may include a cylinder, a sleeve, a tube, or a coil. Under low temperature conditions, the first opening 42 and the second opening 44 may be aligned to allow the maximum amount of fluid flow. However, as the temperature of the fluid within the inner chamber 34 increases, the expansive element 70 may expand more than the inner shell 26 and the outer shell 28, causing the overlap of the first opening 42 and the second opening 44 to decrease, restricting fluid flow through the self-modulating valve 14.

As illustrated in FIG. 7, the metallic expansion mechanism 64 may also include an unexpansive element 66 and a central element 68. The unexpansive element 66 may be any portion of the metallic expansion mechanism 64 which is coupled to the expansive element 70. Examples of the unexpansive element 66 may include a cylinder, a sleeve, a tube, or a coil. The unexpansive element 66 may be made of the first material. The central element 68 may be any portion of the metallic expansion mechanism 64 which is coupled to the expansive element 70 and is also coupled to one of the inner shell 26 or the outer shell 28. Examples of the central element 68 may include a cylinder, a sleeve, a tube, a column, or a coil. The central element 68 may be made of the first material.

As illustrated in FIG. 7, the unexpansive element 66 may have a first end coupled to the second end 58 of the outer shell 28, and a second end which extends into the inner chamber 34. The central element 68 may have a first end which is coupled to the second end 54 of the inner shell and which extends into the inner chamber 34. The unexpansive element 66 may be radially spaced apart from the central element 68 with respect to the axis X.

The expansive element 70 may be coupled to the second end of the unexpansive element 66 and to the second end of the central element 68, as illustrated in FIG. 7. The expansive element 70 may be spaced apart from the unexpansive element 66 and the central element 68 by spacers 74 which extend radially from the axis X. The spacers 74 may be any component which extends radially to couple the expansive element 70 to the unexpansive element 66. Examples of the spacers 74 may include a disc, a panel, or a rod. The spacers 74 may be made of either the first material or the second material and may be the point where the first material of the unexpansive element 66 is joined to the second material of the expansive element 70 by welding or another technique. In some embodiments, the central element 68 may be coupled to the outer shell 28 instead of the inner shell 26 and the unexpansive element 66 may be coupled to the inner shell 26 instead of the outer shell 28.

As shown in FIG. 7, the metallic expansion mechanism 64 may be arranged such that, when the temperature of the fluid rises, the unexpansive element 66 and the expansive element 70 cause the outer shell 28 and the inner shell 26 to contract toward one another. This effect may be achieved by placing the unexpansive elements 66 and the central element 68, each having the lower coefficient of thermal expansion, at the outermost and innermost positions within the metallic expansion mechanism 64. Alternatively, expansive elements 70 could be positioned at the outermost and innermost positions within the metallic expansion mechanism 64 to cause the outer shell 28 and the inner shell 26 to retract from each other when the fluid increases in temperature.

To maximize the contracting or retracting effect of the metallic expansion mechanism 64, the expansive elements 70, the central element 68, and the unexpansive element 66 may each extend as far as possible across the inner chamber 34. Where the metallic expansion mechanism 64 creates a contracting effect under high temperatures, some space should be maintained between the spacers 74 at the ends of the expansive element 70 the unexpansive elements 66, and the central element 68, from the second end 54 of the inner shell 26 and the second end 58 of the outer shell 28. For example, the expansive elements 70, the central element 68, and the unexpansive element 66 may each extend may extend between 60% and 90% across the length of the inner chamber 34 when the fluid passing through the self-modulating valve 14 is at a low temperature.

Under low temperature conditions, the first opening 42 and the second opening 44 may be aligned to allow the maximum amount of fluid flow. However, as the temperature of the fluid within the inner chamber 34 increases, the expansive element 70 may expand more than the unexpansive element 66 and the central element 68, causing the overlap of the first opening 42 and the second opening 44 to decrease, restricting fluid flow through the self-modulating valve 14.

Figure 8:
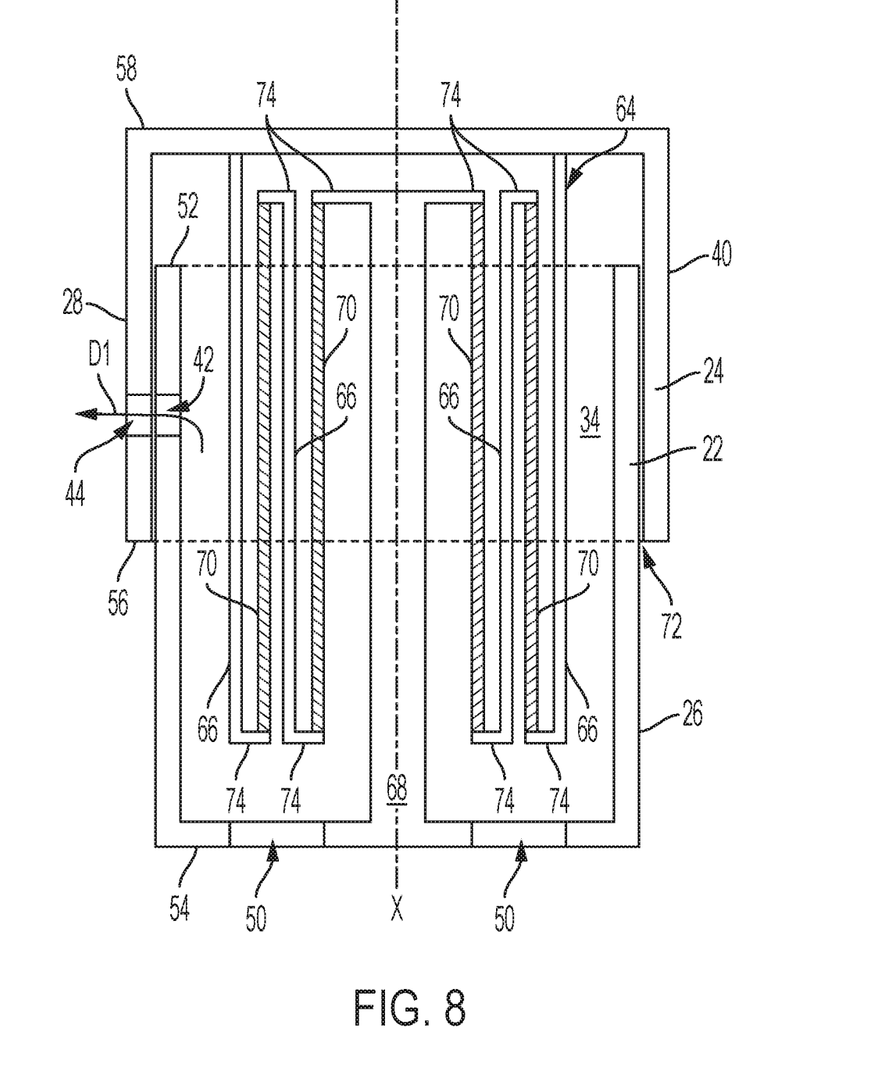
FIG. 8 illustrates a cross-sectional view of a sixth example of an inner shell and an outer shell of a self-modulating valve.

FIG. 8 illustrates a cross-sectional view of another example of the inner shell 26 and the outer shell 28 including expansive elements 70 and unexpansive elements 66. In some embodiments, the difference between the coefficient of thermal expansion between the expansive element 70 and the unexpansive element 66 may be small enough that multiple passes of expansive elements 70 and unexpansive elements 66 may be needed to sufficiently move the inner shell 26 relative to the outer shell 28 when the fluid within the self-modulating valve 14 increases in temperature. Therefore, the metallic expansion mechanism 64 may include multiple concentric expansive elements 70 and unexpansive elements 66. The outermost unexpansive element 66 may be coupled to the second end 58 of the outer shell 28. The central element 68 may be coupled to the second end 54 of the inner shell 26 and may be aligned along the axis X. From the outermost unexpansive element 66, the metallic expansive mechanism 64 may extend radially inward toward the central element 68, alternating between expansive elements 70 and unexpansive elements 66 coupled together by spacers 74.

When the temperature of the fluid within the self-modulating valve increases, each expansive element 70 will expand more than the adjacent unexpansive element 66 or central element 68, causing the inner shell 26 to contract relative into the outer shell 28. The metallic expansion mechanism 64 may have up to 6 alternating sleeves of unexpansive elements 66 and expansive elements 70 all concentric about the axis X.

Figure 9:
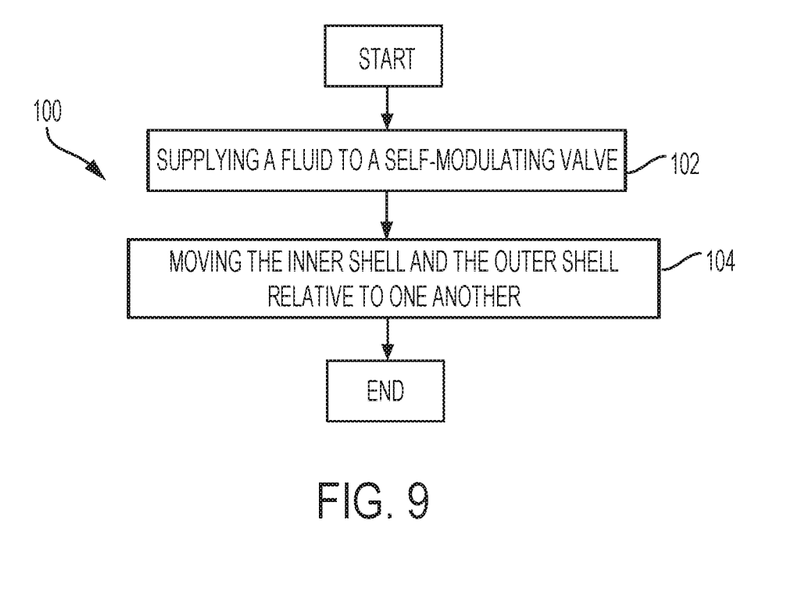
FIG. 9 illustrates a flow diagram of an example of a method of operating an anti-icing system.

FIG. 9 illustrates a flow diagram of an example of a method of operating an anti-icing system 10 (100). The steps may include additional, different or fewer operations than illustrated in FIG. 9. The steps may be executed in a different order than illustrated in FIG. 9.

The method (100) may include supplying a fluid to the self-modulating valve (102) such that the inner shell 26 and the outer shell 28 are in the first position. In the first position, the first opening 42 and the second opening 44 define the passageway 48 between the inner chamber 34 and the outer chamber 36, allowing fluid to flow through the self-modulating valve 14. In the first position, the passageway 48 has a first cross-sectional area.

The method (100) further includes moving the inner shell 26 and the outer shell 28 relative to one another to the second position (104). In the second position, the passageway 48 defined by the first opening 42 and the second opening 44 has a second cross-sectional area which is less than the first cross-sectional area. The movement of the inner shell 26 and the outer shell 28 relative to one another (104) may be caused by a change in the fluid conditions of the fluid supplied to the self-modulating valve 14, such as an increase in temperature or pressure.

The method (100) may be implemented with additional, different, or fewer components. For example, the method (100) may include operating the shut-off valve 12 to a allow fluid to flow the inlet 18 to the self-modulating valve 14. The method (100) may also include operating the shut-off valve 12 to direct the flow of the fluid from the inlet 18 to a vent 16 before operating the shut-off valve 12 to allow fluid to flow to the self-modulating valve 14.

Each component may include additional, different, or fewer components. For example, the vent 16 may not be present in some embodiments. Additionally, in some embodiments, the shut-off valve 12 may not be present. Furthermore, an additional shut-off valve 12 may be included downstream from the self-modulating valve 14 to entirely seal the self-modulating valve while the anti-icing system is not in use.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A fluid valve comprising:
an inner shell comprising a sidewall having a first opening and an interior surface defining an inner chamber;
an outer shell comprising a sidewall having a second opening and an exterior surface defining an outer chamber, wherein the inner shell is positioned within the outer shell and the inner shell is movable relative to the outer chamber between a first position and a second position by a change in fluid conditions of a fluid supplied to the fluid valve, and
wherein the first opening and the second opening overlap to defined define a passageway extending from the interior surface of the inner shell to the exterior surface of the outer shell, and relative movement of the inner shell from the first position toward the second position reduces a cross-sectional area of the passageway.

2. The fluid valve of aspect 1, wherein one of the inner shell and the outer shell are biased toward the first position by a biasing mechanism which is responsive to a change in pressure of the fluid supplied to the fluid valve.

3. The fluid valve of aspect 2, wherein the biasing mechanism is positioned outside the inner chamber and is configured to exert an expanding force on one of the inner shell and the outer shell.

4. The fluid valve of aspect 2, wherein the biasing mechanism is positioned inside the inner chamber and is configured to exert a retracting force on one of the inner shell and the outer shell.

5. The fluid valve of any of aspects 1 through 4, wherein the fluid valve further comprises a metallic expansion mechanism extending between the inner shell and the outer shell, wherein the metallic expansion mechanism is configured to move the inner shell relative to the outer shell responsive to a change in a temperature of the fluid supplied to the fluid valve.

6. The fluid valve of aspect 5, wherein the inner shell and the outer shell are made of a first metal having a first coefficient of thermal expansion, and the metallic expansion mechanism comprises a second metal having a second coefficient of thermal expansion which is greater than the first coefficient of thermal expansion.

7. The fluid valve of aspect 5, wherein the metallic expansion mechanism comprises:
a first element having a first end coupled to the inner shell and a second end extended into the inner chamber, wherein the first element comprises a first material having a first coefficient of thermal expansion;
a second element having a first end coupled to the outer shell and a second end extended into the inner chamber, wherein the second element is spaced apart from the first element and comprises the first material; and
a third element coupled to the second end of the first element and the second end of the second element, wherein the second element comprises a second material having a second coefficient of thermal expansion which is greater than the first coefficient of thermal expansion.

8. The fluid valve of aspect 5, wherein the metallic expansion mechanism comprises a plurality of concentric sleeves positioned within the inner chamber, wherein an outermost sleeve is coupled to one of the inner shell or the outer shell, and an innermost sleeve is coupled to the other of the inner shell or the outer shell, wherein the plurality of concentric sleeves alternatingly comprise a first material having a first coefficient of thermal expansion and a second material having a second coefficient of thermal expansion which is greater than the first coefficient of thermal expansion.

9. The fluid valve of aspect 8, wherein the innermost sleeve and the outermost sleeve comprise the first material.

10. An anti-icing system for use in a gas turbine engine, comprising:
an inlet configured to receive a fluid;
a self-modulating valve comprising an inner shell comprising a sidewall having a first opening and an interior surface defining an inner chamber, and an outer shell comprising a sidewall having a second opening and an exterior surface defining an outer chamber, wherein the inner shell is positioned within the outer shell and the relative positions of the inner shell and the outer shell are movable between a first position and a second position by a change in fluid conditions of the fluid supplied to the inlet, wherein the first opening and the second opening overlap to defined define a passageway extending from the interior surface of the inner shell to the exterior surface of the outer shell, and relative movement of the inner shell from the first position toward the second position reduces a cross-sectional area of the passageway; and
an outlet configured to deliver the fluid to a location.

11. The anti-icing system of aspect 10, wherein the first opening and the second opening are circular.

12. The anti-icing system of aspect 10, wherein one of the first opening and the second opening has a width which varies along an axis defined by the relative movement between the inner shell and the outer shell.

13. The anti-icing system of aspect 10, wherein one of the inner shell or the outer shell has a plurality of openings spaced circumferentially apart from one another, wherein in the first position, the plurality of openings form a plurality of passageways, and wherein in the second position, a portion of the plurality of openings are covered by the other of the outer shell or the inner shell.

14. The anti-icing system of any of aspects 10 through 13, further comprising a shut-off valve arranged between the inlet and the self-modulating valve, wherein the shut-off valve is moveable between a first position allowing fluid to flow to the self-modulating valve, and a second position preventing fluid from flowing to the self-modulating valve.

15. The anti-icing system of aspect 14, wherein the shut-off valve is movable to a third position, preventing fluid from flowing to the self-modulating valve and allowing fluid to flow to a vent.

16. A method of operating an anti-icing system, comprising:
   supplying a fluid to a self-modulating valve, the self-modulating valve comprising an inner shell comprising a sidewall having a first opening and an interior surface defining an inner chamber, and an outer shell comprising a sidewall having a second opening and an exterior surface defining an outer chamber, wherein the inner shell is positioned within the outer shell in a first position such that the first opening and the second opening overlap to define a passageway extending from the interior surface of the inner shell to the exterior surface of the outer shell, the passageway having a first cross-sectional area; and
   moving the inner shell and the outer shell relative to one another to a second position such that the first opening and the second opening overlap to define the passageway having a second cross-sectional area which is less than the first cross-sectional area, wherein moving the inner shell and the outer shell is caused by a change in fluid conditions of the fluid supplied to the self-modulating valve.

17. The method of aspect 16, further comprising operating a shut-off valve to allow fluid to flow from an inlet to the self-modulating valve, wherein the shut-off valve is positioned upstream from the self-modulating valve.

18. The method of aspect 17, further comprising operating the shut-off valve to direct the flow of fluid from the inlet to a vent before operating the shut-off valve to allow fluid flow to the self-modulating valve.

19. The method of any of aspects 16 through 18, wherein the change in fluid conditions is an increase in a pressure of the fluid supplied to the self-modulating valve.

20. The method of any of aspects 16 through 18, wherein the change in fluid conditions is an increase in a temperature of the fluid supplied to the self-modulating valve.

What is claimed is:

1. A fluid valve comprising:
   an inner shell positioned about an axis, the inner shell comprising a sidewall having a first opening and an interior surface defining an inner chamber;
   an outer shell positioned about the axis, the outer shell comprising a sidewall having a second opening and an exterior surface defining an outer chamber, wherein the inner shell is positioned within the outer shell and the inner shell is movable relative to the outer chamber between a first position and a second position by a change in fluid conditions of a fluid supplied to the fluid valve,
   wherein the inner shell further comprises a third opening configured to allow the fluid to flow into the inner chamber, the third opening facing parallel with the axis; and
   wherein the first opening and the second opening overlap to define a passageway extending perpendicular to the axis from the interior surface of the inner shell to the exterior surface of the outer shell, and relative movement of the inner shell parallel with the axis from the first position toward the second position reduces a cross-sectional area of the passageway.

2. The fluid valve of claim 1, wherein one of the inner shell and the outer shell are biased toward the first position by a biasing mechanism which is responsive to a change in pressure of the fluid supplied to the fluid valve.

3. The fluid valve of claim 2, wherein the biasing mechanism is positioned outside the inner chamber and is configured to exert an expanding force on one of the inner shell and the outer shell.

4. The fluid valve of claim 2, wherein the biasing mechanism is positioned inside the inner chamber and is configured to exert a retracting force on one of the inner shell and the outer shell.

5. The fluid valve of claim 1, wherein the fluid valve further comprises a metallic expansion mechanism extending between the inner shell and the outer shell, wherein the metallic expansion mechanism has at least one coefficient of thermal expansion, the metallic expansion mechanism configured to expand according to the at least one coefficient of thermal expansion to move the inner shell relative to the outer shell responsive to a change in a temperature of the fluid supplied to the fluid valve.

6. The fluid valve of claim 5, wherein the at least one coefficient of thermal expansion comprises a second coefficient of thermal expansion, and wherein the inner shell and the outer shell are made of a first metal having a first coefficient of thermal expansion, and the metallic expansion mechanism comprises a second metal having the second coefficient of thermal expansion which is greater than the first coefficient of thermal expansion.

7. The fluid valve of claim 5, wherein the at least one coefficient of thermal expansion comprises a first coefficient of thermal expansion and a second coefficient of thermal expansion, and wherein the metallic expansion mechanism comprises:
   a first element having a first end coupled to the inner shell and a second end extended into the inner chamber, wherein the first element comprises a first material having the first coefficient of thermal expansion;
   a second element having a first end coupled to the outer shell and a second end extended into the inner chamber, wherein the second element is spaced apart from the first element and comprises the first material; and
   a third element coupled to the second end of the first element and the second end of the second element, wherein the second element comprises a second material having the second coefficient of thermal expansion which is greater than the first coefficient of thermal expansion.

8. The fluid valve of claim 5, wherein the at least one coefficient of thermal expansion comprises a first coefficient of thermal expansion and a second coefficient of thermal expansion, and wherein the metallic expansion mechanism comprises a plurality of concentric sleeves positioned within the inner chamber, wherein an outermost sleeve is coupled to one of the inner shell or the outer shell, and an innermost sleeve is coupled to the other of the inner shell or the outer shell, wherein the plurality of concentric sleeves alternatingly comprise a first material having the first coefficient of thermal expansion and a second material having the second coefficient of thermal expansion which is greater than the first coefficient of thermal expansion.

9. The fluid valve of claim 8, wherein the innermost sleeve and the outermost sleeve comprise the first material.

10. An anti-icing system for use in a gas turbine engine, comprising:
    an inlet configured to receive a fluid;
    a self-modulating valve comprising an inner shell comprising a sidewall having a first opening and an interior surface defining an inner chamber, and an outer shell comprising a sidewall having a second opening and an exterior surface defining an outer chamber, wherein the inner shell is positioned within the outer shell and the relative positions of the inner shell and the outer shell are movable between a first position and a second position by a change in fluid conditions of the fluid supplied to the inlet, wherein the first opening and the second opening overlap to defined define a passageway extending from the interior surface of the inner shell to the exterior surface of the outer shell, and relative movement of the inner shell from the first position toward the second position reduces a cross-sectional area of the passageway;
    an outlet configured to deliver the fluid to a location; and
    a shut-off valve arranged between the inlet and the self-modulating valve, wherein the shut-off valve is moveable between a first position allowing fluid to flow to the self-modulating valve, a second position preventing fluid from flowing to the self-modulating valve, and a third position, the shut-off valve, in the third position, preventing fluid from flowing to the self-modulating valve and allowing fluid to flow to a vent.

11. The anti-icing system of claim 10, wherein the first opening and the second opening are circular.

12. The anti-icing system of claim 10, wherein one of the first opening and the second opening has a width which varies along an axis defined by the relative movement between the inner shell and the outer shell.

13. The anti-icing system of claim 10, wherein one of the inner shell or the outer shell has a plurality of openings spaced circumferentially apart from one another, wherein in the first position, the plurality of openings form a plurality of passageways, and wherein in the second position, a portion of the plurality of openings are covered by the other of the outer shell or the inner shell.

14. A method of operating an anti-icing system, comprising:
    supplying a fluid to a self-modulating valve, the self-modulating valve comprising an inner shell comprising a sidewall having a first opening and an interior surface defining an inner chamber, and an outer shell comprising a sidewall having a second opening and an exterior surface defining an outer chamber, wherein the inner shell is positioned within the outer shell in a first position such that the first opening and the second opening overlap to define a passageway extending from the interior surface of the inner shell to the exterior surface of the outer shell, the passageway having a first cross-sectional area;
    moving the inner shell and the outer shell relative to one another to a second position such that the first opening and the second opening overlap to define the passageway having a second cross-sectional area which is less than the first cross-sectional area, wherein moving the inner shell and the outer shell is caused by a change in fluid conditions of the fluid supplied to the self-modulating valve;
    operating a shut-off valve to allow fluid to flow from an inlet to the self-modulating valve, wherein the shut-off valve is positioned upstream from the self-modulating valve; and
    operating the shut-off valve to direct the flow of fluid from the inlet to a vent before operating the shut-off valve to allow fluid flow to the self-modulating valve.

15. The method of claim 14, wherein the change in fluid conditions is an increase in a pressure of the fluid supplied to the self-modulating valve.

16. The method of claim 14, wherein the change in fluid conditions is an increase in a temperature of the fluid supplied to the self-modulating valve.

\* \* \* \* \*